(12) United States Patent
Jaszlics et al.

(10) Patent No.: US 8,506,301 B2
(45) Date of Patent: Aug. 13, 2013

(54) TRANSPORTABLE PROJECTION-BASED SIMULATOR

(76) Inventors: Ivan John Jaszlics, Golden, CO (US); Sheila Lynn Jaszlics, Golden, CO (US); Scot David Sanders, Lakewood, CO (US)

(\*) Notice: Subject to any disclaimer, the term of this patent is extended or adjusted under 35 U.S.C. 154(b) by 1337 days.

(21) Appl. No.: 12/183,808

(22) Filed: Jul. 31, 2008

(65) Prior Publication Data
US 2009/0042173 A1    Feb. 12, 2009

Related U.S. Application Data

(60) Provisional application No. 60/953,044, filed on Jul. 31, 2007.

(51) Int. Cl.
*G09B 9/02* (2006.01)

(52) U.S. Cl.
USPC .......................................................... 434/29

(58) Field of Classification Search
USPC ............... 434/29, 34, 37, 38, 40, 43, 44, 55, 434/62, 69, 219; 296/26.01, 26.02, 26.03, 296/26.04, 26.06, 26.08, 26.1, 26.12, 26.14
See application file for complete search history.

(56) References Cited

U.S. PATENT DOCUMENTS

| | | | | |
|---|---|---|---|---|
| 4,634,384 A * | 1/1987 | Neves et al. | ..................... | 434/44 |
| 4,958,874 A * | 9/1990 | Hegedus | ..................... | 296/26.02 |
| 5,316,480 A * | 5/1994 | Ellsworth | ........................ | 434/29 |
| 5,706,616 A * | 1/1998 | Fernandez | ........................ | 52/143 |
| 5,888,069 A * | 3/1999 | Romanoff et al. | ............... | 434/33 |
| 6,003,995 A * | 12/1999 | Dugdale et al. | ................. | 353/98 |
| 6,034,717 A * | 3/2000 | Dentinger et al. | ............. | 348/51 |
| 6,043,854 A * | 3/2000 | Scott | ............................. | 348/744 |
| 6,209,939 B1 * | 4/2001 | Wacker | ......................... | 296/24.3 |
| 6,813,595 B2 * | 11/2004 | Edgar | ............................. | 703/8 |
| 6,817,866 B1 * | 11/2004 | Ginzburg et al. | ............. | 434/365 |
| 7,407,385 B2 * | 8/2008 | Tůma | ............................ | 434/236 |
| 2009/0042173 A1 * | 2/2009 | Jaszlics et al. | ............... | 434/219 |

\* cited by examiner

*Primary Examiner* — Kurt Fernstrom
(74) *Attorney, Agent, or Firm* — Leon S. Erikson; John R. Ley

(57) ABSTRACT

A transportable projection-based simulator is expanded on one or both sides. Bowl-like screen assemblies partially surround a mock cabin within the simulator. A combination of projectors and mirrors reflect images of a virtual landscape onto the screen assemblies. A trainee within the mock cabin can lean out of the mock cabin and look down at the image of the virtual landscape projected onto the portion of the screen assembly below without interfering with the projection of that image.

17 Claims, 15 Drawing Sheets

TRANSPORTABLE PROJECTION-BASED SIMULATOR

CLAIM OF PRIORITY

This application claims the benefit of U.S. provisional application No. 60/953,044 filed Jul. 31, 2007.

FIELD OF THE INVENTION

This invention relates to transportable simulators. More particularly, the present invention relates to a new and improved transportable simulator which is self-contained within a trailer, is projection-based, is transportable over public highways, and which creates a completely immersive virtual environment which may include the impression of being high over a virtual landscape.

BACKGROUND OF THE INVENTION

Personnel training costs represent a significant expense for most businesses and governments. Part of this expense derives from the time taken to train or mentor a new trainee by an experienced worker. The experienced worker is typically not as productive with his or her other job responsibilities when training a new trainee. The longer the length of time it takes to train a new trainee, the higher the costs to the business.

Another personnel training cost many organizations face involves the cost of using equipment for training purposes. Oftentimes such equipment is prohibitively expensive to operate solely for training purposes and training is therefore combined with the productive use of the equipment. Combining the training of personnel with the productive use of expensive equipment generally has two significant drawbacks. One is that the equipment, similarly to the experienced worker conducting the training, is not used as efficiently as it usually is when not being used for training. Extra time taken by the experienced worker to explain the operation of the equipment and to guide the new trainee diminishes the efficiency by which the equipment is typically used. The second is that training must wait until opportunities arise in which the expensive equipment can be productively used for normal purposes in addition to being used for training purposes. Waiting for opportunities to concurrently productively use and train with the equipment can significantly prolong the length of time it takes to effectively train new personnel.

One solution to the above problems of training new personnel to use or work with expensive equipment is to use a training simulator. A training simulator ideally allows the new trainee to learn how to use the expensive equipment the trainee will use on the job at a fraction of the cost of using the expensive equipment for training purposes. Generally, the more expensive the equipment used on the job, the more expensive the simulator must be to mimic the functionality of the expensive equipment. The cost of a training simulator is recouped by an organization over time through the savings resulting from each new trainee trained not having to use the expensive equipment for training purposes. The more trainees the organization can train through the training simulator the quicker the cost of the simulator is recouped. The length of time it takes to train a trainee using a training simulator is reduced compared to having to wait to use actual equipment.

Many small to medium companies which use expensive equipment have too small a number of potential trainees to justify the costs of purchasing a training simulator. Companies in this situation are often forced to engage the services of a simulator company which offers the use of training simulators on a fee per use basis. Additionally, the larger and more complex a simulator must be to mimic the functionality of the expensive equipment, the less likely it is that the simulator is easily transportable. Transporting personnel to a remote location for the purpose of training with a training simulator is another cost incurred by the organization in the training of new personnel.

Transportable training simulators which can be transported to a training site are a solution to the costs of transporting personnel to a remote location to train with a fixed-site training simulator. Transportable training simulators which travel on the public highways must meet the same state regulatory criteria as other vehicles of similar size and weight. Preferably, a transportable training simulator is not so large that it requires a wide-load or other special permit before being transported. Transportable training simulators are usually housed in a standard sized tractor trailer to avoid the costs and hassle of obtaining special permits from each state the trailer travels through.

A typical consequence of using standard sized trailers to transport a training simulator to a training site is that the training simulator must either be removed from the trailer and assembled at the training site or else fit and operate within the standard sized trailer. Removing the training simulator from the trailer and assembling the simulator outside of the trailer allows the assembled simulator to be much larger than the interior dimensions of the trailer. However, unloading a simulator from a trailer and assembling the simulator within a building or other fixed structure typically involves much labor and can take weeks or months for large simulators. Prior art simulators which operate within a trailer typically require trainees to wear head mounted displays (HMDs). Simulators which are contained within a standard sized non-expandable trailer are also typically too small to contain a mock cabin or other training structure large enough to accommodate several interacting crew members.

Training simulators generally contain image generating computers which produce images of a virtual landscape or work area by either presenting the images on a large screen or by presenting the images onto a heads mounted display (HMD) which is worn by the trainee. Images are typically presented on a large screen by either projecting the images onto a screen having a gray background or by using a conventional visual display unit, such as a monitor or television unit. As a practical matter, visual display units are limited in size to the largest television sets sold by electronic manufacturers. Visual display units typically have a frame which surrounds and protects a glass screen that the images are projected through. When multiple visual display units are oriented side by side to display a larger image, the frames create a discontinuity in the image projected by the screens. Such discontinuities in the image tend to diminish the sense of immersion the training simulator is expected to create.

HMDs are usually less expensive than a collection of visual display units but cause a similar diminished sense of immersion as do the visual display units. The basic disadvantages of the HMDs are the small field of view and lower resolution compared to projection or display based systems. This causes a significant reduction of peripheral vision available to the trainee and an observable pixilation of the virtual scene. HMDs are further disadvantaged by the typical tether which connects the HMDs to the computer image generators. Such HMDs tend to limit the free movement of trainees during training as well as tending to delay the updating of images in response to a head movement of the trainee, both of which diminish the sense of immersion into the training simulation.

HMDs also tend to limit the ability of trainees to interact with one another in a multi-person training simulation.

An important aspect of many training simulations is the ability of a trainee to interact with physical items or controls within a mock cabin or work environment. HMD-based simulators severely restrict the ability of a trainee to interact with physical items within the training simulation because the display of the HMD does not show the physical items within the simulator. An HMD-based simulator may even result in the trainee learning bad habits, due to the inability of trainee to interact a with realistic physical model of the structure the simulator is supposed to emulate. Trainees training in an HMD-based simulator also miss out on the opportunity to develop muscle memory from repeating training tasks which involve interaction with the physical structure of the simulator without separating themselves from the virtual scene by looking out from an HMD display.

These and other considerations have led to the evolution of the present invention.

SUMMARY OF THE INVENTION

The present invention is related to a transportable simulator. The transportable simulator is contained within an expandable trailer which contains a mock cabin, multiple screen assemblies, projectors, and a computer system which generates images for the projectors to display on the screen assemblies. The expandable trailer expands on one or both sides to increase the interior space within the trailer. After the trailer is expanded, the screen assemblies are assembled in the expanded interior space on one or both sides of the mock cabin. The screen assemblies are similar in shape to one quarter of an oblate sphere and generally resemble the shape of a bowl when two screen assemblies are positioned on either side of the mock cabin. The projectors take advantage of mirrors to increase the projection distance from the projector to the screen. The projector and mirror combination also direct light cones projected by the projectors displaced away from openings in the mock cabin from which a trainee may lean out of. This allows a trainee to look down onto a bottom portion of the screen assembly from a position outside of the mock cabin without interfering with the images projected onto the screen assembly. The projectors and the mirrors are attached to projector arms which swing out into an expanded interior space from a projection truss, which is attached to the ceiling of the trailer. The individual images projected onto the screen assembly from each of the projectors overlap slightly and ideally present a virtual landscape which creates the illusion of being within the virtual landscape from the perspective of a trainee within the mock cabin.

The transportable simulator is self-contained, transportable, completely immersive, and does not require a separate building or other fixed structure in which to house the simulator. The trailer of the transportable simulator is ideally dimensioned to be transported on public highways without a special permit. The transportable simulator projects a virtual landscape on the bowl-like screen assemblies which allows trainees to look out and down from the mock cabin in order to view the virtual landscape beneath the mock cabin. Unlike HMD-based simulators, trainees can wear whatever equipment the trainees typically wear on the job and are not forced to wear a bulky HMD. Also unlike HMD-based simulators, trainees can interact with and see physical items within the mock cabin as part of the training simulation.

One aspect of the present invention involves a transportable projection-based simulator. The simulator comprises a trailer, a mock cabin, and a screen assembly. The screen assembly has a projection surface which faces the mock cabin and which curves from a top near vertical position to a bottom near horizontal position. The top of the screen assembly also curves away from the mock cabin between two top corners of the screen assembly. A plurality of projectors are positioned to project images onto the screen assembly.

Another aspect of the present invention involves a simulator which includes a trailer having an expandable roof section, an expandable side wall section, and an expandable floor section. The expandable roof section, the expandable side wall section, and the expandable floor section are all moved from a compact position to an expanded position to increase an interior space inside the trailer.

Another aspect of the present invention involves a method of establishing a training simulator. The training simulator includes a trailer. A side of the trailer is expanded to increase an interior space of the trailer on the side expanded. Screen assembly pieces are assembled to create a screen assembly within the trailer. A plurality of projectors are positioned so that images from the projectors cover the screen assembly.

A more complete appreciation of the present invention and its scope may be obtained from the accompanying drawings, which are briefly summarized below, from the following detailed description of a preferred embodiment of the invention, and from the appended claims.

DETAILED DESCRIPTION

Figure 1:
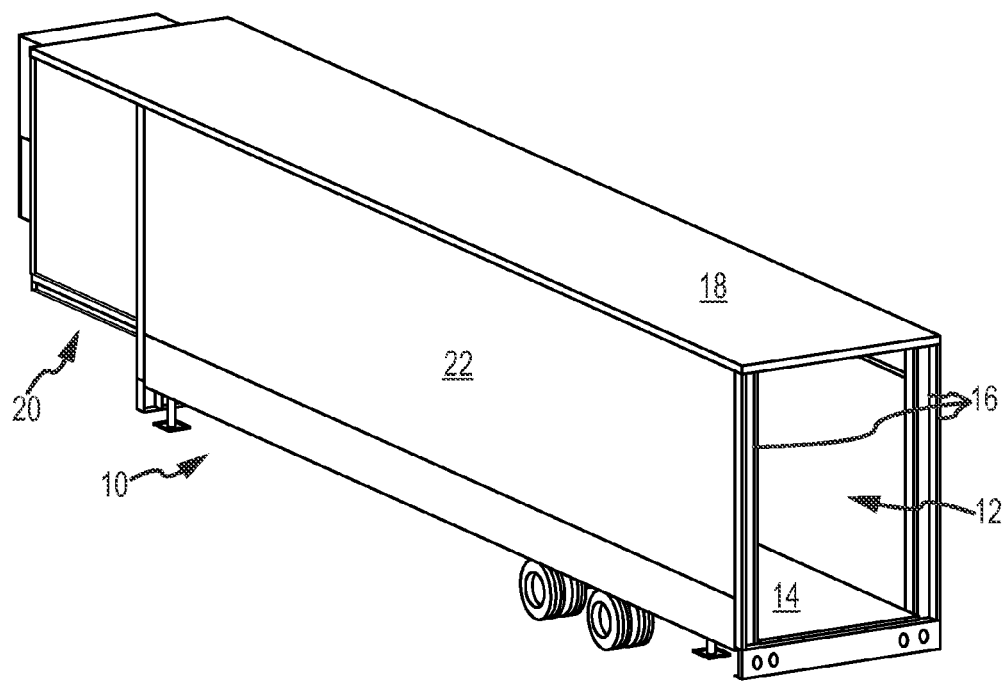
FIG. 1 is a perspective view of a transportable projection-based simulator in a compact configuration which incorporates the present invention.
Figure 2:
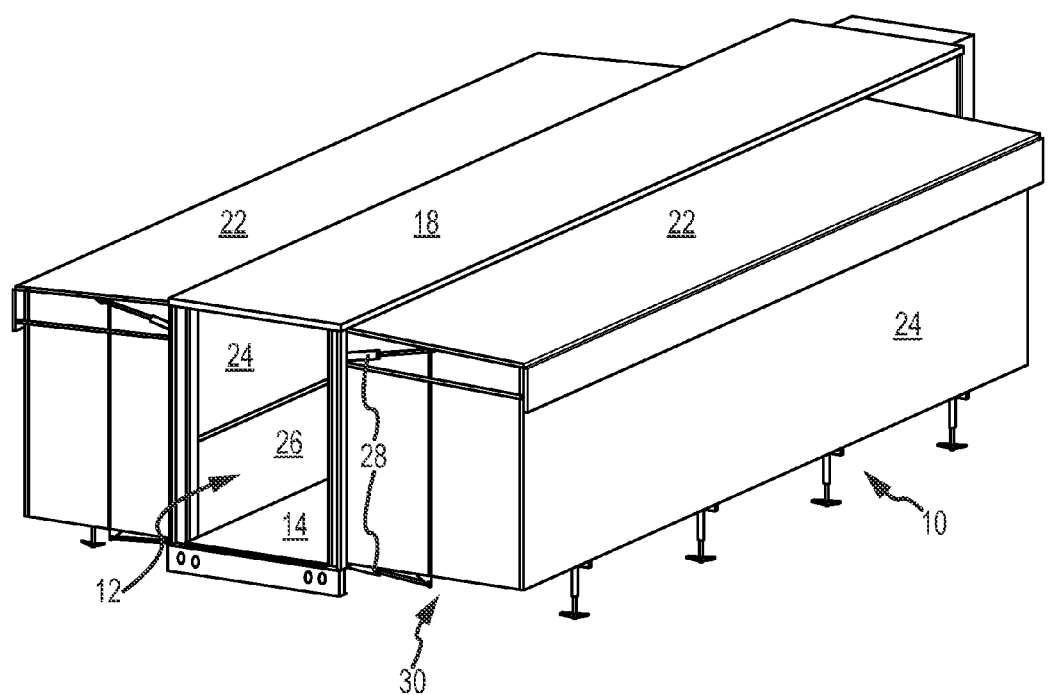
FIG. 2 is a perspective view of the simulator shown in FIG. 1 in an expanded configuration.

A transportable projection-based simulator ("simulator") 10 is shown in FIGS. 1 and 2. The simulator 10 is shown without a rear section to better view an interior space 12 of the simulator 10. The simulator 10 has a fixed floor 14, vertical supports 16, a fixed roof 18, and a front section 20, all of which remain in a fixed relative position with each other and which are collective referred to as a fixed frame. On both the left and right sides of the simulator 10 there is an expandable roof section 22, an expandable side wall section 24 and an expandable floor section 26 which move with respect to the fixed frame. The expandable roof section 22, the expandable side wall section 24 and the expandable floor section 26 are moveable between compact positions in which the simulator 10 is in the compact configuration as shown in FIG. 1 and expanded positions in which the simulator 10 is in the expanded configuration as shown in FIG. 2. The interior space 12 of the simulator 10 in the expanded configuration is much greater in size than the interior space 12 in the compact configuration. The compact configuration of the simulator 10 is used when transporting the simulator 10 by a tractor unit (not shown) over public highways. The expanded configuration of the simulator 10 is used to conduct trainee simulations.

Figure 3:
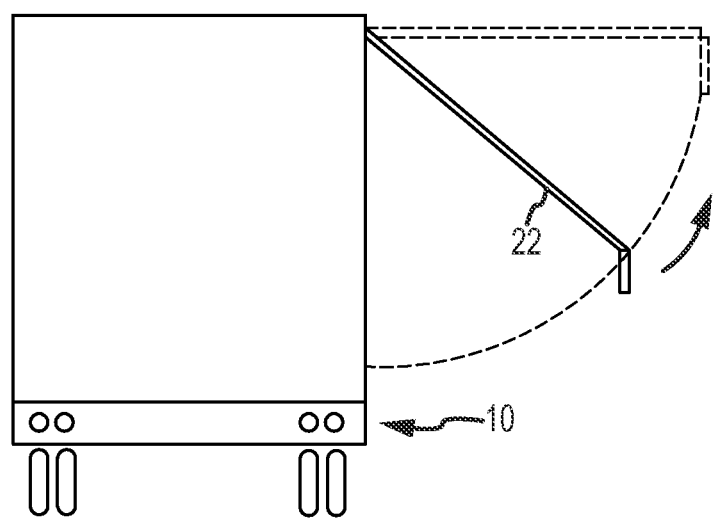
FIG. 3 is a rear plan view of the simulator shown in FIG. 1 showing the process of expanding an expandable roof of the simulator shown in FIG. 1.

The process of expanding one of the sides of the simulator 10 is shown in FIGS. 3-6 and is referred to as an expansion process. Each of the three expandable sections is preferably moved between the compact and expanded positions by multiple actuators 28 (FIG. 2). The expandable roof section 22 serves as the exterior wall of one side of the simulator 10 when the simulator 10 is in the compact position. The expandable roof section 22 is the first of the three expandable sections to be expanded during the expansion process. The expandable roof section 22 is moved between its compact position and its expanded position by rotating outward and upward as shown in FIG. 3. The expandable roof section 22 covers an expanded side portion 30 (FIG. 2) of the simulator 10 in the expanded position.

Figure 4:
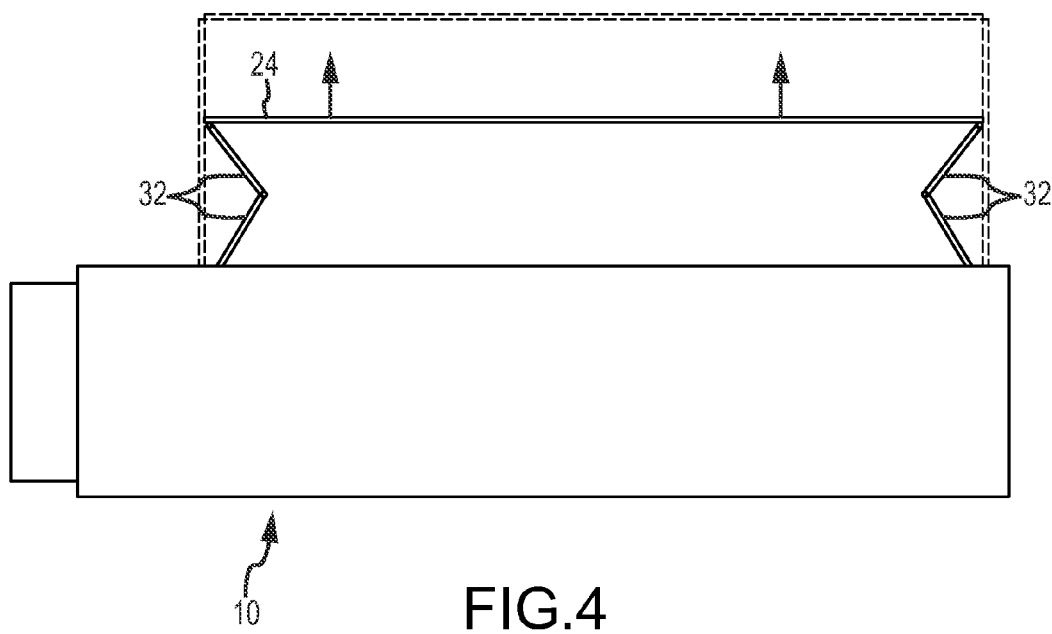
FIG. 4. is a top plan view of the simulator shown in FIG. 1 showing the process of expanding an expandable side of the simulator shown in FIG. 1.

The expandable side wall section 24 resides on the interior side of the expandable roof section 22 when both the expandable side wall section 24 and the expandable roof section 22 are in the compact position. The expandable side wall section 24 is expanded after the expandable roof section 22 has been expanded. The expandable side wall section 24 maintains a vertical orientation in both the compact and expanded positions and moves perpendicular to the fixed frame of the simulator 10 while maintaining a parallel relationship with the fixed frame, as shown in FIG. 4. The expandable side wall section 24 is connected to the fixed frame by a total of four accordion panels 32, two of which are hingeably attached to the expandable side wall section 24 at a front end and two of which are hingeably attached to the expandable side wall section 24 at a rear end. The accordion panels 32 are folded inward towards one another when the expandable side wall section 24 is in the compact position and assume a side-to-side relationship when the expandable side wall section 24 is in the expanded position.

During the expansion of the expandable side wall section 24, the expandable roof section 22 is raised slightly higher than the position the expandable roof section 22 assumes when in the expanded position in order allow the expandable side wall section 24 to move into the expanded position without interference from the expandable roof section 22.

Figure 5:
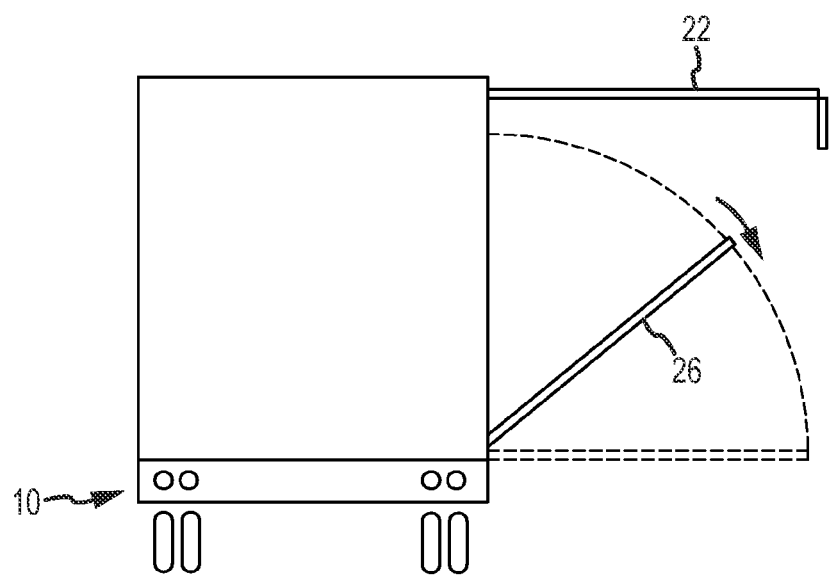
FIG. 5 is a rear plan view showing the expansion process of an expandable floor of the simulator shown in FIG. 1.
Figure 6:
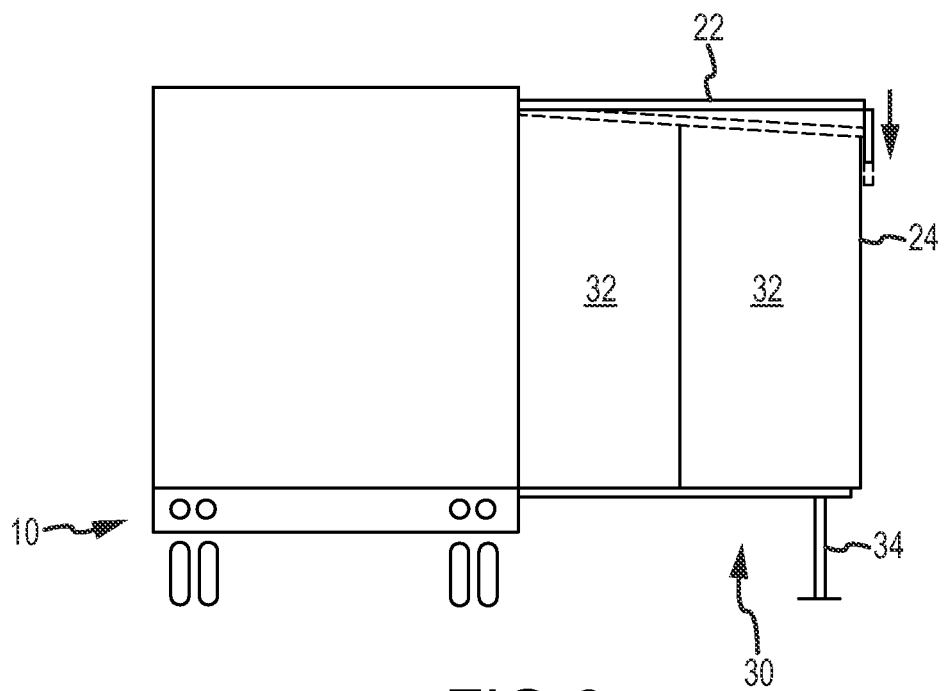
FIG. 6 is a rear plan view showing the lowering of the expandable roof onto the expandable side of the simulator shown in FIG. 1.

The last of the three expandable sections to be expanded during the expansion process is the expandable floor section 26. The expandable floor section 26 assumes a vertical orientation when the expandable floor section 26 is in the compact position. The expandable floor section 26 assumes a horizontal position when the expandable floor section 26 is in the expanded position. The expandable floor section 26 is hinged to the fixed frame and rotates out and down when the expandable floor section 26 is moved from the compact position to the expanded position, as shown in FIG. 5 (shown without the expandable side wall section 24 for clarity). When the expandable floor section 26 is in the expanded position, the surface of the expandable floor section 26 is parallel to the surface of the fixed floor 14. The expandable floor section 26 is supported by external supports such as outriggers 34 when the expandable floor section 26 is in the expanded position, as shown in FIG. 6. After the expandable floor section 26 has been moved into the expanded position, the expandable roof section 22 is lowered to rest on top of the expandable side wall section 24, as shown in FIG. 6.

Although the simulator 10 is shown in FIG. 2 as expandable on both sides, other embodiments of the simulator 10 may be expandable on only one side. Further details concerning the fixed frame and the expandable sections 22, 24 and 26 can be found in U.S. application Ser. No. 12/182,309, entitled EXPANDABLE MOBILE FACILITY, by Hickman, et al., which application is incorporated by reference herein.

Figure 7:
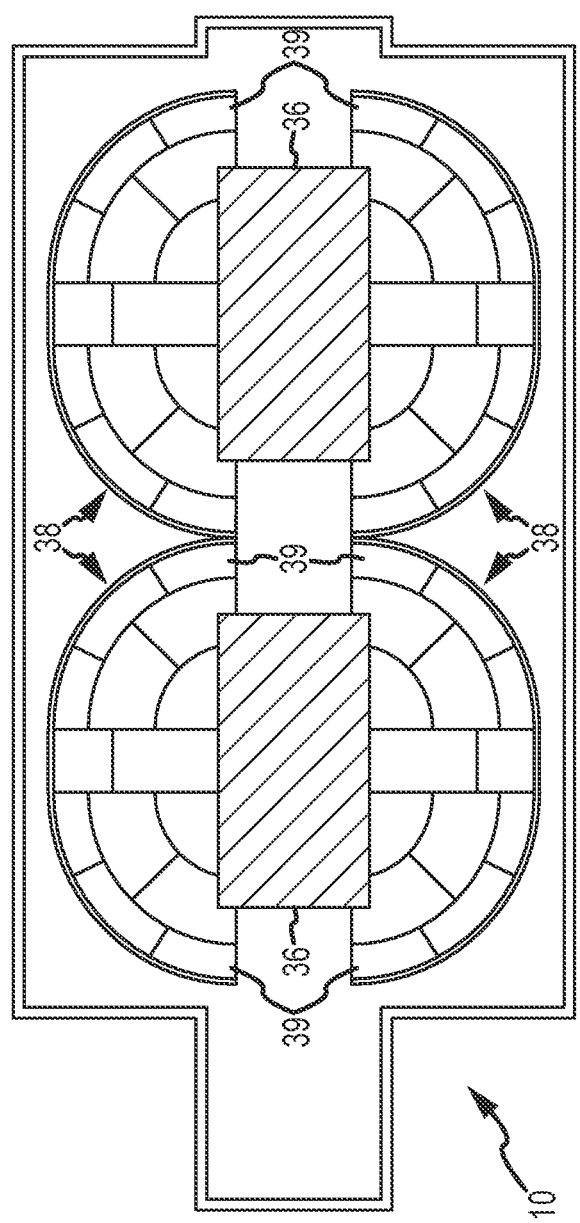
FIG. 7 is a top plan view showing the orientation of the two bowl-like screen assemblies and two mock cabins within the simulator shown in FIG. 2.
Figure 8:
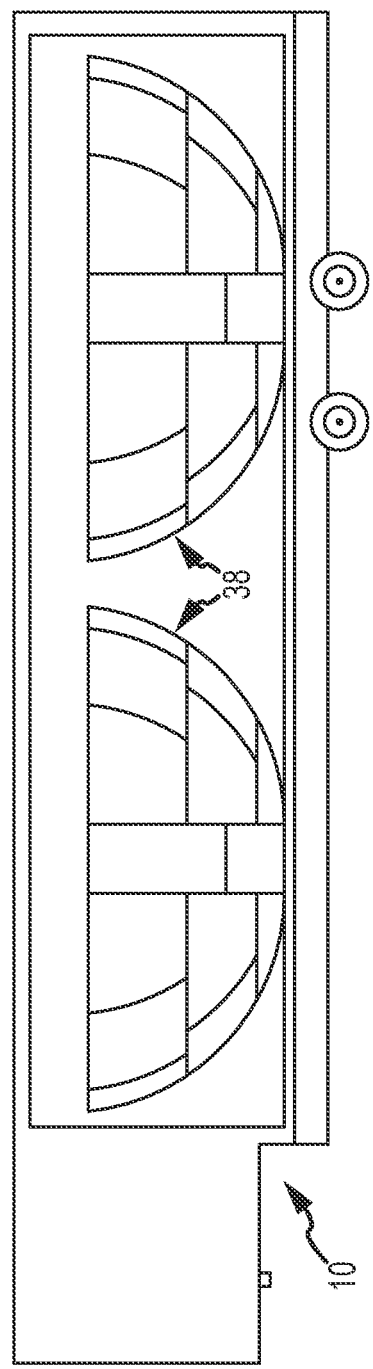
FIG. 8 is a side plan view showing the orientation of two bowl-like screen assemblies within the simulator shown in FIG. 2.
Figure 9:
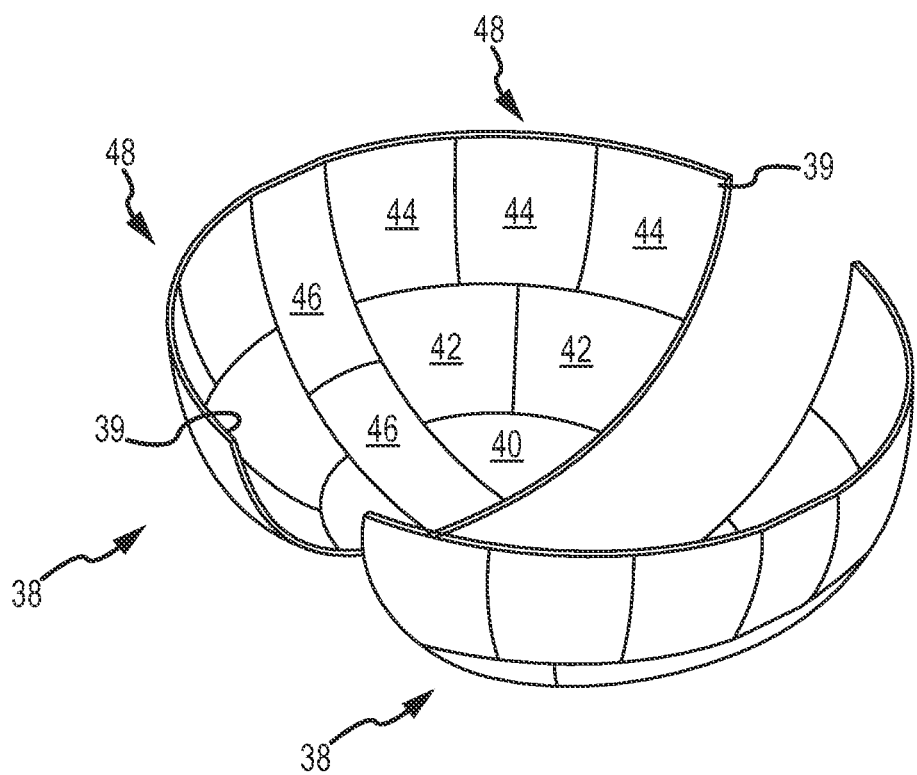
FIG. 9 is a perspective view of the two halves of one of the bowl-like screen assemblies shown in FIG. 7.

FIG. 7 shows two mock cabins 36 within the simulator 10 which are constructed to mimic the appearance of an actual cabin, such as a helicopter cabin, a crane cabin or the like. The mock cabins 36 are preferably constructed so that they fit within the simulator 10 when the simulator 10 is in the compact configuration. Screen assemblies 38 are setup around the mock cabins 36 when the simulator 10 is in the expanded configuration, as shown in FIGS. 7 and 8. The screen assemblies 38 are bowl-like in appearance and are near vertical at the top and near horizontal at the bottom. Each screen assembly 38 has two corner ends 39 at the top of the screen assembly 38 closest to the mock cabin 36. The surfaces of the screen assembly 38 at the two corner ends 39 are substantially parallel. Each screen assembly 38 extends from a top position near the fixed roof to a bottom position in proximity to the fixed floor, as shown in FIG. 8. A significant feature of the screen assemblies 38 is that when a trainee within one of the mock cabins 36 looks out and down from a window or door on the side of the mock cabin 36, the trainee sees only the screen assembly (or an image projected onto it). This makes the screen assemblies 38 ideally suited for projecting images of a virtual landscape onto, especially a virtual landscape which presents the illusion of being high above the ground. The ability to project images onto the screen assemblies which simulate the appearance of being high off the ground makes the simulator 10 ideal for simulating aircraft, building cranes, or other equipment which can be high above the ground.

The screen assemblies 38 are constructed from four differently shaped screen pieces: quarter pieces 40, mid-height pieces 42, top level pieces 44 and center pieces 46. Each of the screen assemblies 38 contains two center pieces 46 which connect together two eighth sections 48. Each eighth section 48 is generally in the shape of one eighth of an oblate spheroid. An oblate spheroid is a symmetrical ellipsoid having a shorter polar axis than the diameter of its equatorial axis. Each eighth section 48 contains one quarter piece 40, two mid-height pieces 42 and three top level pieces 44. The two center pieces 46 of each screen assembly 38, when combined, generally resemble a portion of an elliptic cylinder. One of the advantages to constructing the screen assemblies in this manner is that the length of the screen assemblies 38 can easily be changed by changing the length of the center pieces 46, or by using multiples of two center pieces 46 to connect the eighth sections 48. The four differently shaped screen pieces are easily stacked in a rack when the simulator 10 is in the compact configuration.

Figure 10:
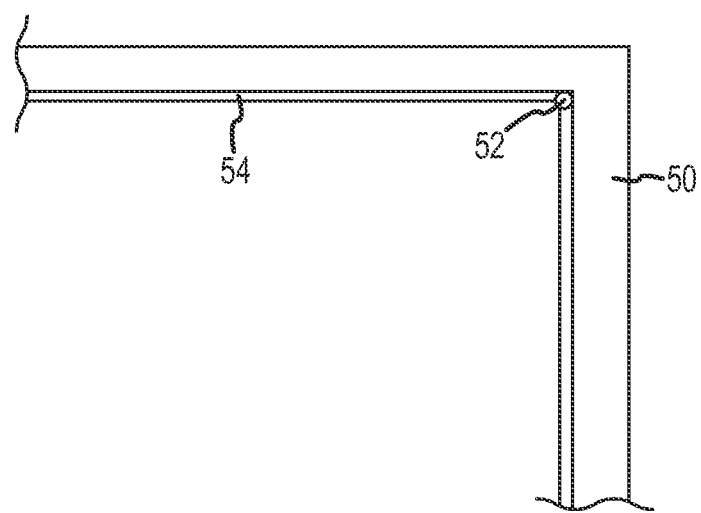
FIG. 10 is a cross-sectional view of a screen piece of one of the bowl-like screen assemblies shown in FIG. 9, showing the process of creating corners of the screen piece.

The screen pieces are preferably constructed from fiberglass, or other strong and light material. One of the problems with using traditional fiberglass creation techniques to create screen pieces is that the square edges of the screen pieces tend to be fragile. This fragility results from the structural material of the fiberglass having a large radius at the corners of the screen pieces. A gel coat is usually used to build up the corners of the screen pieces so that the corners are square. A new and improved technique for forming the screen corners involves pulling structural material 50 around a taut thread 52, as shown in FIG. 10. Gel coat 54 is then applied to solidify the shape of the structural material 50 and to create the fiberglass. The resulting corners are strong due to the structural material 50 having been pulled tight around the taut thread 52.

Figure 11:
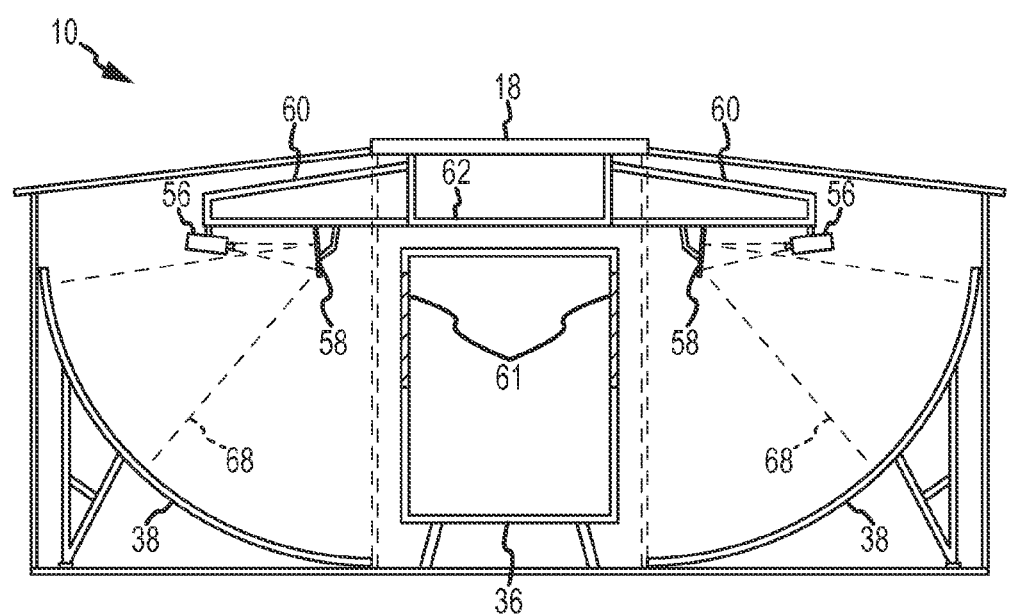
FIG. 11 is a rear plan cross-sectional view of the simulator shown in FIG. 7 showing two inward facing projector and mirror combinations.
Figure 12:
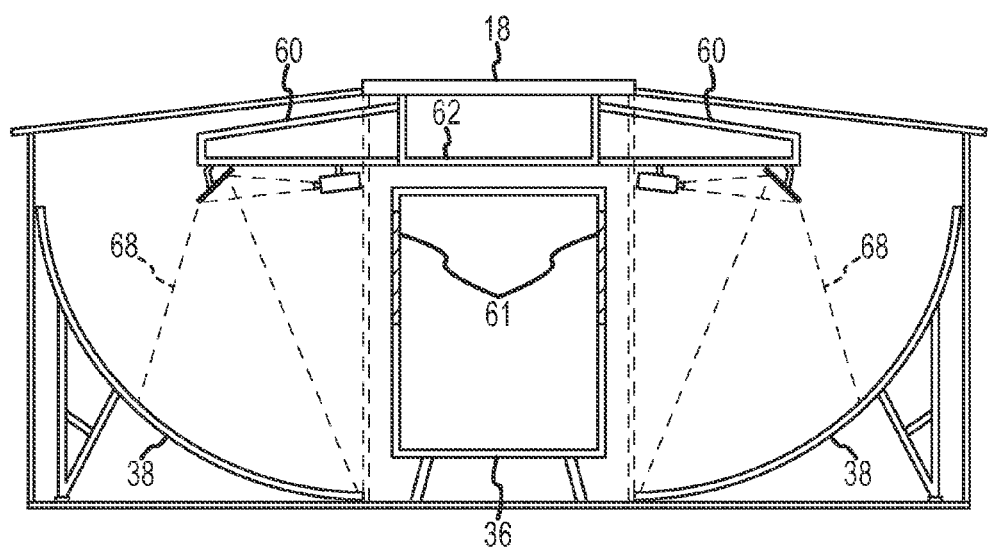
FIG. 12 is a rear plan cross-sectional view of the simulator shown in FIG. 7 showing two outward facing projector and mirror combinations.

A plurality of projectors 56 project images onto the screen assemblies, as shown in FIGS. 11 and 12. The projectors 56 are oriented differently depending on whether the images from the particular projector 56 cover the top portion or bottom portion of the screen assembly 38.

The Projectors 56 which cover the top portion of the screen assembly 38 face inwards and project an image towards the mock cabin 36 which is reflected back towards the top portion of the screen assembly 38 by a mirror 58, as shown in FIG. 11. The projectors 56 which cover the bottom portion of the screen assembly 38 face outwards and project an image away from the mock cabin 36 which is reflected back to the bottom portion of the screen assembly 38 by a mirror 58, as shown in FIG. 12. Each of the projectors 56 and the mirror 58 related to that projector 56 is attached to a projector arm 60 which is pivotally attached to one side of a projector truss 62. The projector truss 62 is secured to the fixed roof 18 on the interior of the simulator 10. The projector arms 60 are movable between an expanded position in which the projector arms 60 face towards the side of the simulator 10 closest to the projector arms 60 and a compact position in which the projector arms 60 are oriented parallel to the sides of the simulator 10 along one side of the projector truss 62. When in the compact position, the projector arms 60 and attached components are within the interior space 12 (FIG. 1) within the fixed frame of the simulator 10. Some of the projector arms 60 may have a single projector and mirror combination while other projector arms 60 may have multiple projector and mirror combinations.

A significant advantage of using the mirrors 58 in conjunction with the projectors 56 as shown in FIGS. 11 and 12 is that light cones 64 generated by the projectors 56 are spaced away from the sides of the mock cabins 36. This allows a trainee training within one of the mock cabins 36 to lean out of a window 61 or opening of the mock cabin 36 to view images projected onto the portion of the screen assembly 38 directly below his head with minimal risk that the trainee will contact one of the light cones 64. This is an especially useful feature where the simulator 10 is simulating flying in a helicopter. Both military personnel and civilian police may lean out of a helicopter or mock cabin of a helicopter for training purposes, such as for firing a machine gun or tracking a target. If the trainee were to break one of the light cones 64 by leaning out of the mock cabin 36, the trainee might block an important image necessary for the training simulation.

The mounting height of the projectors 56 and the mirrors 58 is generally the same height as the top of the screen assemblies 38 and the top of the mock cabins 36. This ensures that neither the projectors 56 nor the mirrors 58 interfere with the view of images on the top of the screen assembly 38 by a trainee within one of the mock cabins 36.

Figure 13A:
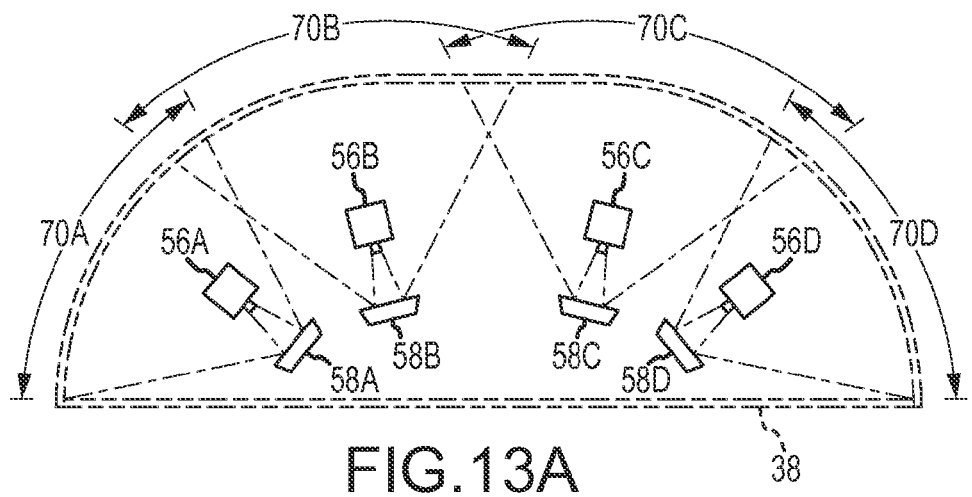
FIGS. 13A and 13B are diagrammatic illustrations of the projection fields of the projector and mirror combinations which cover the top portion and bottom portion of one half of the screen assembly of the simulator shown in FIG. 7.
Figure 13B:
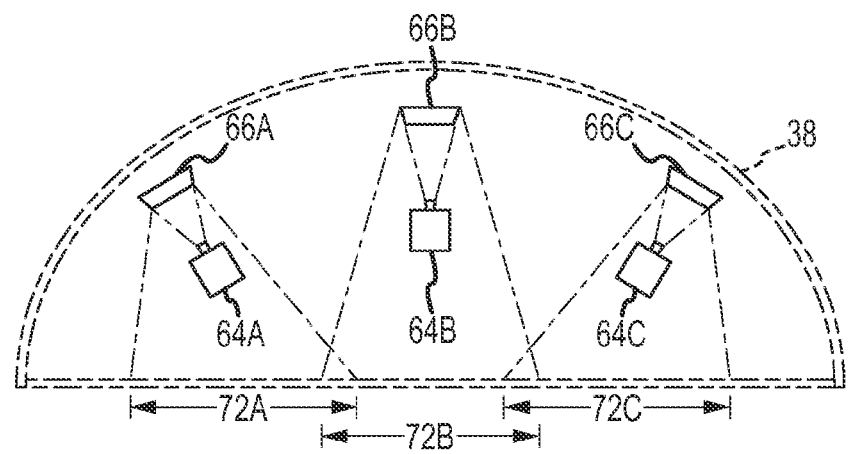

Four inward facing projectors 56A-56D and four outward facing mirrors 58A-58D associated with the inward facing projectors 56A-56D are shown in FIG. 13A. Each of the inward facing projectors 56A-56D covers a certain coverage area 66A-66D of the top portion of the screen assembly 38. Three outward facing projectors 56E-56G and three inward facing mirrors 58E-58G associated with the outward facing projectors 56E-56G are shown in FIG. 13B. Each of the outward facing projectors 56E-56G covers a particular coverage area 66E-66G of the bottom portion of the screen assembly 38.

Figure 14A:
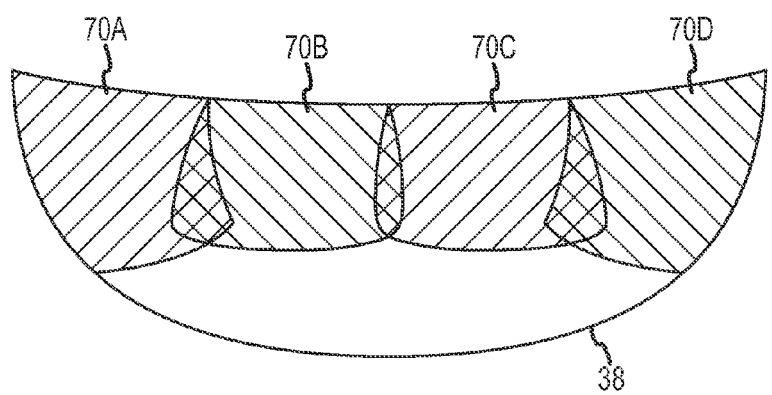
FIGS. 14A and 14B are side diagrammatic illustrations of the coverage areas on one half of the screen assembly by the projector and mirror combinations shown in FIG. 13A and 13B.
Figure 14B:
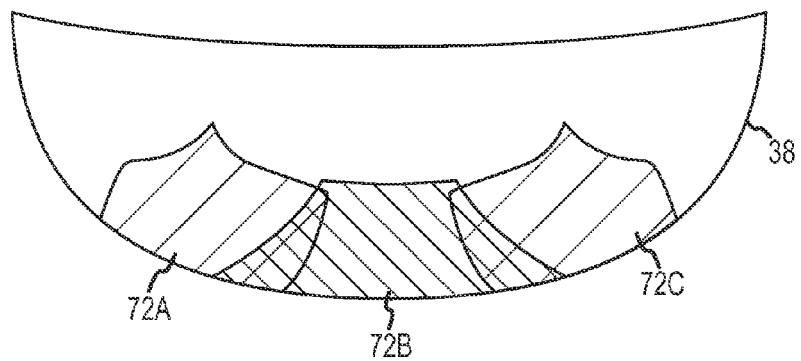

The inward facing projector coverage areas 66A-66D and the outward facing projector coverage areas 66E-66G are shown on screen assemblies 38 in FIGS. 14A and 14B, respectively. The coverage areas 66A-66G overlap slightly at the boundaries with adjacent coverage areas 66A-66G. This overlap ensures complete coverage of the screen assembly 38.

Figure 15:
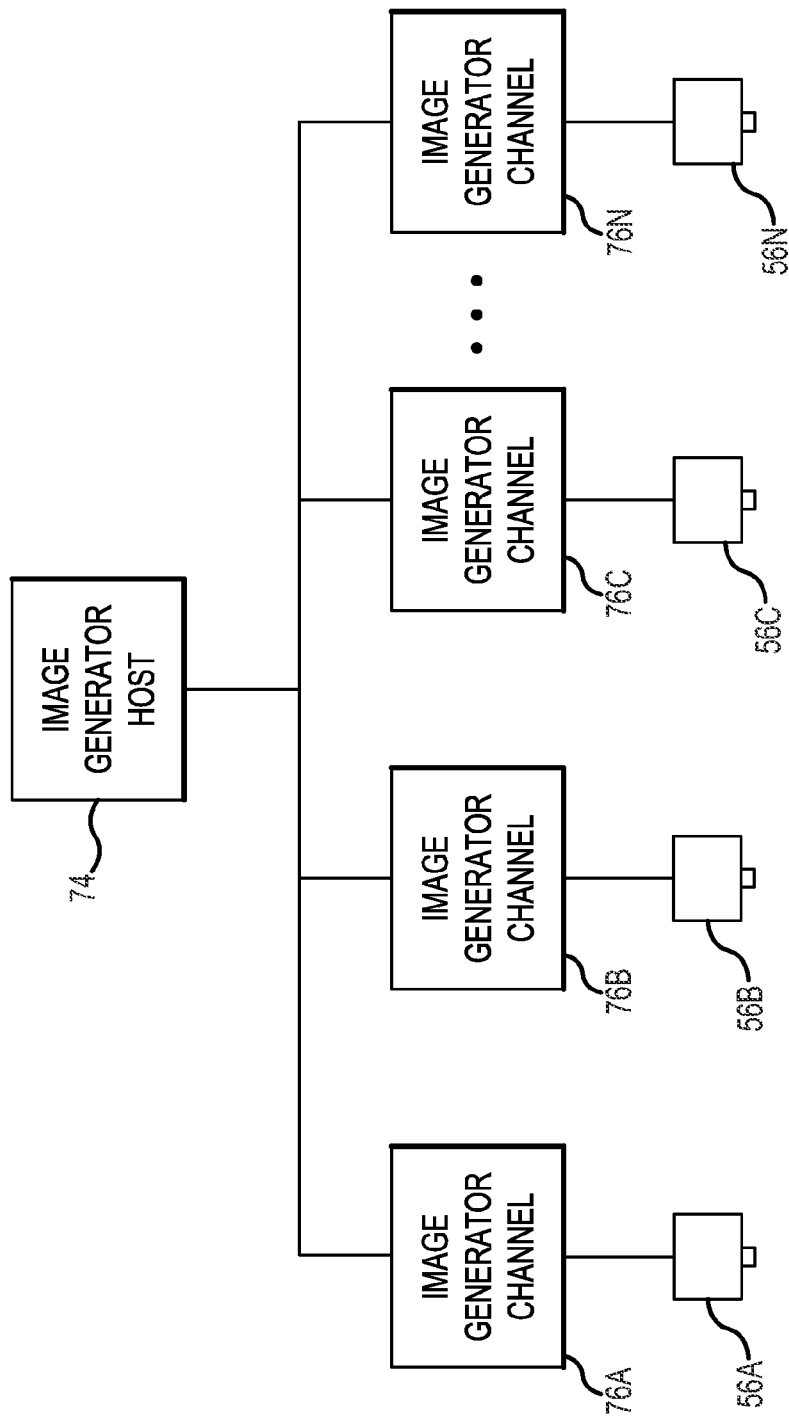
FIG. 15 is a diagrammatic illustration of the computers which produce images for the projectors of the simulator of FIG. 1.

An image generator host computer 68, shown in FIG. 15, within the simulator generates visual information for the mock cabin 36 within a virtual landscape for image generator channel computers 70A-70N. The image generator host computer 68 is connected to the image generator channel computers 70A-70N, also within the simulator 10, by a high speed computer network. The image generator channel computers 70A-70N each generate an image of a portion of the virtual landscape based on the position information from the image generator host computer 74 and the direction of view from the position indicated by the position information for a particular and connected projector 56A-56N. The combined images on both of the screen assemblies 38 on either side of the mock cabin 36 from each of the projectors 56A-56N create the illusion from the perspective of a trainee within one of the mock cabins 36 of actually being within the virtual landscape.

The transportable projection-based simulator of the present invention as previously described has many advantages over the prior art. The simulator is easily transported to training sites, expanded into the expanded configuration, and the screen assemblies assembled within a shorter period of time than prior art transportable projection-based simulators which must be unloaded from a trailer and moved into a building for assembly. The simulator presents an out and down view of a virtual landscape from within the mock cabin which is ideal for training simulations of helicopters, building cranes, and other structures high off of the ground. A trainee can lean out of the mock cabin of the simulator without interfering with the images projected onto the screen assembly adjacent to the trainee. Trainees can wear their regular work gear when participating in a training simulation within the simulator and are not required to wear any special equipment, such as an HMD. Multiple trainees can also participate in a coordinated manner in multi-person training simulations within one of the mock cabins of the simulator with a sense of realism not available in other trailer-based simulators. These and other improvements and advantages will be more apparent after comprehending the full ramifications of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed:

1. A transportable projection-based simulator, comprising:
   a trailer;
   a mock cabin within the trailer, the mock cabin defining at least one visual opening;
   a screen assembly having a top and a bottom, the screen assembly having a projection surface which substantially faces the mock cabin, the top of the screen assembly having two corner ends with a curvature between the two corner ends, the two corner ends of the top of the screen assembly being closer to the mock cabin than the top of the screen assembly between the two corner ends, the projection surface being substantially vertical near the top and which curves to approach a horizontal orientation at the bottom; and
   a plurality of projectors positioned to project images onto the screen assembly, the projected images substantially covering the projection surface of the screen assembly.

2. A transportable projection-based simulator as defined in claim 1, further comprising:
   an additional mock cabin and an additional screen assembly; and wherein each screen assembly is positioned adjacent to one of the mock cabins.

3. A transportable projection-based simulator as defined in claim 1, wherein the screen assembly further comprises:
   two eighth sections, each eighth section generally shaped like one eighth of a sphere and having three edges;
   a center section, the center section generally shaped like one fourth of a cylinder; and wherein:
   each eighth section is attached to a different side of the center section.

4. A transportable projection-based simulator as defined in claim 3, wherein the simulator comprises at least two screen assemblies, one positioned on either side of the mock cabin, the simulator further comprising:
   a center section which connects the two screen assemblies.

5. A transportable projection-based simulator as defined in claim 3, wherein each eighth section further comprises:
   a quarter piece having a projection surface and three edges, the first two of the three edges of the quarter piece each forming a portion of one of the edges of the eighth section and curving within a plane that is substantially perpendicular to the projection surface of the quarter piece adjacent to the plane, the third edge curving within a plane that is not substantially perpendicular to the projection surface of the quarter piece adjacent to the plane; and
   a plurality of non-quarter pieces each having four sides, at least one side of each non-quarter piece forming a portion of one of the edges of the eighth section.

6. A simulator as defined in claim 1, wherein the trailer further comprises:
   a fixed frame which includes a fixed floor, a fixed roof, and a plurality of vertical supports which support the fixed roof above the fixed floor, the fixed frame having an interior space between the fixed floor and the fixed roof;
   an expandable floor section hingeably coupled to the fixed floor and moveable between a compact position in which the expandable floor section is substantially vertical and an expanded position in which the expandable floor section is substantially horizontal;
   an expandable side wall section hingeably coupled to the fixed frame and moveable between a compact position in which the expandable side wall section resides within the interior space of the fixed frame and an expanded position in which the expandable side wall section is spaced away from the fixed frame, the expandable side wall section maintaining a vertical orientation in both the compact and expanded positions;
   an expandable roof section hingeably coupled to the fixed frame and moveable between a compact position in which the expandable roof section is substantially vertical and an expanded position in which the expandable roof section rests on top of the expandable side wall section when the expandable side wall section is in the expanded position; and
   wherein the expandable roof section, the expandable side wall section and the expandable floor sections expand the interior space of the simulator when in the expanded positions.

7. A transportable projection-based simulator as defined in claim 6, wherein each side of the simulator has an expandable floor section, an expandable side wall section, and an expandable roof section.

8. A transportable projection-based simulator as defined in claim 6, wherein some of the plurality of projectors project images onto a top half of the screen assembly, some of the plurality of projectors project images onto a bottom half of the screen assembly, the area of the screen assembly on which the image from a single projector is projected is a coverage area, and each coverage area has some overlap with adjacent coverage areas.

9. A transportable projection-based simulator as defined in claim 8, further comprising:
   a plurality of image generating channel computers which communicate with the plurality of projectors and supply the projectors with information to construct images to be projected onto the coverage areas, and wherein:
   the location of the coverage areas on the screen assembly is substantially fixed.

10. A transportable projection-based simulator as defined in claim 9, further comprising:
    a projector truss attached to the fixed roof;
    a plurality of projector arms hingeably attached to the projector truss; and wherein:
    at least one of the plurality of projectors is attached to each projector arm, the projector arms move between a compact position in which the projector arms do not interfere with the movement of the expandable roof section, the expandable side wall section or the expandable floor section, and an expanded position in which the projector arm is positioned so that each projector attached to the projector arm projects an image onto the correct coverage area for that particular projector.

11. A transportable projection-based simulator as defined in claim 10, further comprising:
    a plurality of mirrors, the plurality of mirrors attached to at least some of the projector arms and at least some of the plurality of projectors projecting images onto the plurality of mirrors which are reflected onto the coverage areas, with each mirror reflecting the images from one of the plurality of projectors; and wherein:
    each of the mirrors is attached to the same projector arm as the projector whose images the mirror reflects.

12. A transportable projection-based simulator as defined in claim 11, wherein the projected images from the plurality of projectors create light cones as they pass through the space between the mirrors and the screen assembly, edges of the light cones closest to the mock cabin are further from a point horizontally displaced from a mid-point of the opening of the mock cabin than they are from points horizontally displaced from the top and bottom of the mock cabin.

13. A method of establishing a training, simulator, the simulator comprising a trailer, a plurality of screen assembly pieces, and a plurality of projectors, wherein the trailer comprises an expandable roof section, an expandable side wall section, an expandable floor section, and a plurality of projector arms which are hingeably coupled to the trailer and to each of which are attached at least one of the plurality of projectors, the method comprising:
  expanding a side of the trailer to increase an interior space of the trailer on the side of the trailer which is expanded, the added interior space being an expanded interior space and the non-expanded interior space being fixed interior space;
  expanding the side of the trailer by expanding the expandable roof section and expanding the expandable side wall section and expanding the expandable floor section;
  assembling the screen assembly pieces to create a screen assembly within the trailer;
  locating the screen assembly so that at least a portion of the screen assembly is in the expanded interior space;
  positioning the plurality of projectors so that images from the plurality of projectors substantially cover the screen assembly; and
  positioning the plurality of projectors by moving the plurality of projector arms from a compact position within the fixed interior space to an expanded position in which the projector arms extend into the expanded interior space on the expanded side of the trailer.

14. A method of establishing a training simulator as defined in claim 13, wherein the trailer further comprises a mock cabin having viewing openings, the method additionally comprising:
  orienting the screen assembly within the expanded side of the trailer so that a top portion of the screen assembly is substantially vertical and further displaced from the mock cabin than a bottom portion of the screen assembly which is more horizontal than vertical and closer to the mock cabin, and so that substantially all of a projection surface of the screen assembly is viewable by a person from the viewing opening of the mock cabin.

15. A method of establishing a training simulator as defined in claim 14, additionally comprising:
  designating some of the plurality of projectors for displaying images on a top portion of the screen assembly; and
  designating some of the plurality of projectors for displaying images on a bottom portion of the screen assembly.

16. A method of establishing a training simulator as defined in claim 15, additionally comprising:
  orienting the projectors designated for displaying images on the top portion of the screen assembly to face away from the screen assembly;
  orienting the projectors designated for displaying images on the bottom portion of the screen assembly to face towards the screen assembly; and
  reflecting the images from the oriented projectors onto the portions of the screen assembly according to the designation respectively given each projector.

17. A method of establishing a training simulator as defined in claim 15, additionally comprising:
  designating a higher number of projectors for displaying images on the top portions of the screen assemblies than the number of projectors designated for displaying images on the bottom portions of the screen assemblies.

\* \* \* \* \*